(12) United States Patent
Mohanty et al.

(10) Patent No.: US 12,174,878 B2
(45) Date of Patent: Dec. 24, 2024

(54) LOG PROVIDER RECOMMENDATION USING MACHINE LEARNING

(71) Applicant: Dell Products L.P., Round Rock, TX (US)

(72) Inventors: Bijan Kumar Mohanty, Austin, TX (US); Hung Dinh, Austin, TX (US); Prateek Mishra, Gurgaon (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/124,899

(22) Filed: Mar. 22, 2023

(65) Prior Publication Data

US 2024/0320255 A1 Sep. 26, 2024

(51) Int. Cl.
*G06F 16/38* (2019.01)
*G06F 16/35* (2019.01)

(52) U.S. Cl.
CPC .............. *G06F 16/38* (2019.01); *G06F 16/35* (2019.01)

(58) Field of Classification Search
CPC ................................. G06F 16/35; G06F 16/38
See application file for complete search history.

(56) References Cited

U.S. PATENT DOCUMENTS

| | | | |
|---|---|---|---|
| 10,572,159 B1* | 2/2020 | Thrane | G06F 3/0647 |
| 10,657,099 B1* | 5/2020 | Vona | G06F 11/3006 |
| 2006/0224531 A1* | 10/2006 | Abrahao | G06F 11/3414 |
| | | | 714/E11.193 |
| 2010/0293416 A1* | 11/2010 | Xu | G06F 11/3636 |
| | | | 714/45 |
| 2013/0097706 A1* | 4/2013 | Titonis | G06F 21/566 |
| | | | 726/22 |
| 2016/0055496 A1* | 2/2016 | Goldberg | G06Q 30/0202 |
| | | | 705/7.31 |
| 2018/0004623 A1* | 1/2018 | Krishnamoorthy | |
| | | | G06F 11/3495 |
| 2021/0303431 A1* | 9/2021 | Grigoryan | G06F 11/3476 |
| 2021/0357302 A1* | 11/2021 | Hoffnung | G06F 11/3428 |
| 2022/0058072 A1* | 2/2022 | Poghosyan | G06F 18/24317 |
| 2022/0277176 A1* | 9/2022 | Bhatia | G06N 3/045 |

FOREIGN PATENT DOCUMENTS

CN 111367874 A * 7/2020 ......... G06F 16/1815

OTHER PUBLICATIONS

Hackage, "An Implementation of Canonical JSON," https://hackage.haskell.org/package/canonical-json#:~:text=The%20%22canonical%20JSON%22%20format%20is%20designed%20to%20provide,or%20authenitcate%20JSON%20data%20structures%2C%20including%20embedded%20signatures, Accessed Mar. 13, 2023, 4 pages.

(Continued)

*Primary Examiner* — Tarek Chbouki
(74) *Attorney, Agent, or Firm* — Ryan, Mason & Lewis, LLP

(57) ABSTRACT

A method comprises receiving a request to log at least one operation of a plurality operations, wherein the request includes one or more features of the at least one operation. The one or more features are analyzed using one or more machine learning algorithms. The method further comprises selecting, based at least in part on the analyzing, a log provider of a plurality of log providers to log the at least one operation, and interfacing with the log provider to enable logging of the at least one operation.

20 Claims, 12 Drawing Sheets

(56) References Cited

OTHER PUBLICATIONS

Techopedia, "Canonical Data Model," https://www.techopedia.com/definition/30598/canonical-data-model-cdm, Accessed Mar. 13, 2023, 9 pages.
U.S. Appl. No. 17/946,223 filed in the name of Bijan Kumar Mohanty et al. Sep. 16, 2022, and entitled "Technical Support Service Location Recommendation Using Machine Learning."
U.S. Appl. No. 17/980,906 filed in the name of Bijan Kumar Mohanty et al. Nov. 4, 2022, and entitled "Logistics Provider Recommendation Using Machine Learning."

\* cited by examiner

| Application | Type | Domain | Production | Cost (Low/Medium/High) | Logging Time (ms) | Log Provider |
|---|---|---|---|---|---|---|
| Lightning | CRM | Services | Yes | High | 17 | Splunk |
| Premier | Portal | Sales | Yes | Medium | 24 | DataDog |
| Rox Star | ERP | Finance | No | Low | 35 | ELK |
| AERO | API | Services | Yes | High | 11 | Splunk |
| Tech Direct | Portal | Services | No | Low | 45 | ELK |

Target: {Log Provider}

```
import numpy as np
import pandas as pd
from sklearn.model_selection import train_test_split
from sklearn.ensemble import RandomForestClassifier
from sklearn.metrics import accuracy_score
from sklearn.metrics import confusion_matrix
from sklearn.tree import DecisionTreeClassifier
from sklearn import tree import warnings filter
from warnings import simplefilter
# ignore all future warnings
simplefilter(action='ignore', category=FutureWarning)
```

```
log_tran_df = pd.read_csv("data/log_transactions.csv")
log_tran_df.head()
```

| | application | type | domain | production | cost | logging_time | log_provider |
|---|---|---|---|---|---|---|---|
| 0 | lightning | crm | services | yes | high | 17 | splunk |
| 1 | premier | portal | sales | yes | medium | 24 | datadog |
| 2 | revstar | erp | finance | no | low | 35 | elk |
| 3 | aero | app | services | yes | high | 11 | splunk |
| 4 | techdirect | portal | services | no | low | 45 | elk |

FIG. 8A

```
# Encode the categorical values by using Label Encoding
from sklearn.preprocessing import LabelEncoder log_tran_df['application'] = LabelEncoder().fit_transform(log_tran_df['application'])
log_tran_df['type'] = LabelEncoder().fit_transform(log_tran_df['type'])
log_tran_df['domain'] = LabelEncoder().fit_transform(log_tran_df['domain'])
log_tran_df['production'] = LabelEncoder().fit_transform(log_tran_df['production'])
log_tran_df['cost'] = LabelEncoder().fit_transform(log_tran_df['cost'])
log_tran_df['log_provider'] = LabelEncoder().fit_transform(log_tran_df['log_provider'])

log_tran_df.head()
```

FIG. 8B

| | application | type | domain | production | cost | logging_time | log_provider |
|---|---|---|---|---|---|---|---|
| 0 | 1 | 1 | 2 | 1 | 1 | 17 | 2 |
| 1 | 2 | 0 | 1 | 1 | 0 | 24 | 0 |
| 2 | 3 | 2 | 0 | 0 | 0 | 36 | 1 |
| 3 | 0 | 0 | 2 | 2 | 1 | 15 | 2 |

```
# Split train and test data sets
#first get the independent variables and dependent variable separated
features = [col for col in log_tran_df.columns if col != 'log_provider']

X_train, X_test, y_train, y_test = train_test_split(log_tran_df[features], log_tran_df['log_provider'],
                                                    test_size=.3, random_state=1)
```

```
# Train model using training data
trained_model = RandomForestClassifier(criterion='entropy')
trained_model.fit(X_train, y_train)

predictions = trained_model.predict(X_test)

# Train and Test Accuracy
print("Train Accuracy % :: ", accuracy_score(y_train, trained_model.predict(X_train))*100)
print("Test Accuracy % :: ", accuracy_score(y_test, predictions)*100)
print("Confusion matrix ", confusion_matrix(y_test, predictions))
```

LOG PROVIDER RECOMMENDATION USING MACHINE LEARNING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to log provider analysis in information processing systems.

BACKGROUND

Typically, the requirements for log management vary from one application to another. As different logging tools have different capabilities, some applications are better suited for one log provider, while others are better suited for another provider. In existing product architectures, using a specific log management platform by an application may restrict the application to the specific log management platform, rendering it difficult to switch to a different log management platform without losing data and without making code modifications that impede the performance of the application.

SUMMARY

Embodiments provide a log provider management platform in an information processing system.

For example, in one embodiment, a method comprises receiving a request to log at least one operation of a plurality operations, wherein the request includes one or more features of the at least one operation. The one or more features are analyzed using one or more machine learning algorithms. The method further comprises selecting, based at least in part on the analyzing, a log provider of a plurality of log providers to log the at least one operation, and interfacing with the log provider to enable logging of the at least one operation.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 3 depicts sample training data and corresponding features in an illustrative embodiment.

FIG. 6 depicts example pseudocode for importation of libraries in an illustrative embodiment.

FIG. 7A depicts example pseudocode for generation of training data in an illustrative embodiment.

FIG. 7B depicts sample training data in an illustrative embodiment.

FIG. 8A depicts example pseudocode for encoding training data in an illustrative embodiment.

FIG. 8B depicts encoded training data in an illustrative embodiment.

FIG. 9 depicts example pseudocode for splitting a dataset into training and testing components and for creating separate datasets for independent and dependent variables in an illustrative embodiment.

FIG. 10 depicts example pseudocode for training and computing accuracy of a random forest classifier in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

Figure 1:
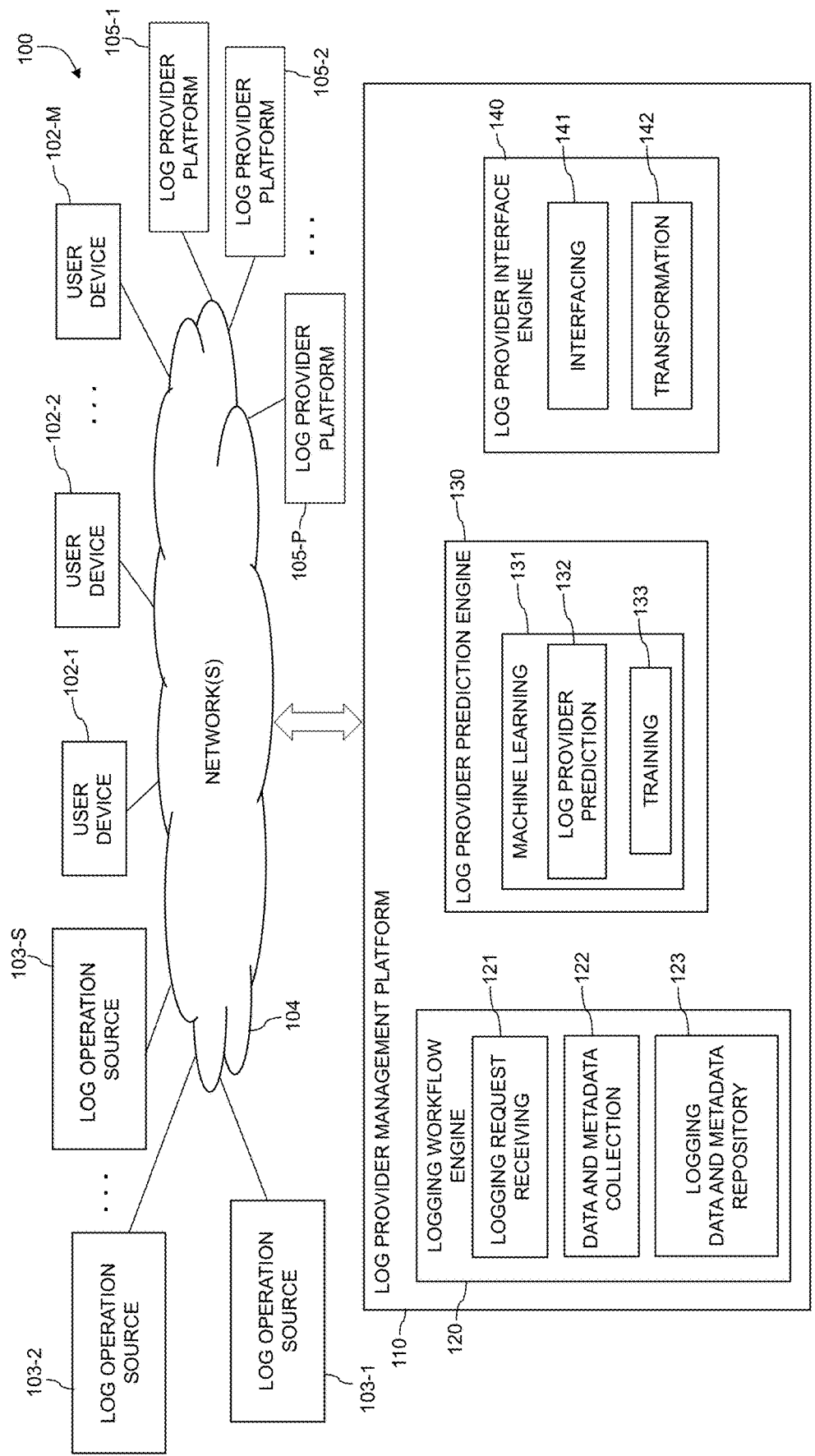
FIG. 1 depicts an information processing system with a log provider management platform in an illustrative embodiment.

FIG. 1 shows an information processing system 100 configured in accordance with an illustrative embodiment. The information processing system 100 comprises user devices 102-1, 102-2, . . . 102-M (collectively "user devices 102") and log provider platforms 105-1, 105-2, . . . 105-P (collectively "log provider platforms 105"). The user devices 102 and log provider platforms 105 communicate over a network 104 with a log provider management platform 110. The variable M and other similar index variables herein such as K, L, S and P are assumed to be arbitrary positive integers greater than or equal to one.

The user devices 102 and one or more devices of the log provider platforms 105 can comprise, for example, Internet of Things (IoT) devices, desktop, laptop or tablet computers, mobile telephones, or other types of processing devices capable of communicating with the log provider management platform 110 over the network 104. Such devices are examples of what are more generally referred to herein as "processing devices." Some of these processing devices are also generally referred to herein as "computers." The user devices 102 and one or more devices of the log provider platforms 105 may also or alternately comprise virtualized computing resources, such as virtual machines (VMs), containers, etc. The user devices 102 and/or one or more devices of the log provider platforms 105 in some embodiments comprise respective computers associated with a particular company, organization or other enterprise.

The terms "customer," "administrator," "personnel" or "user" herein are intended to be broadly construed so as to encompass numerous arrangements of human, hardware, software or firmware entities, as well as combinations of such entities. Log provider management services may be provided for users utilizing one or more machine learning models, although it is to be appreciated that other types of infrastructure arrangements could be used. At least a portion of the available services and functionalities provided by the log provider management platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the log provider management platform 110, as well as to support communication between the log provider management platform 110 and connected devices (e.g., user devices 102 and one or more devices of the log provider platforms 105) and/or other related systems and devices not explicitly shown.

In some embodiments, the user devices 102 are assumed to be associated with repair technicians, system administrators, information technology (IT) managers, software developers, release management personnel or other authorized personnel configured to access and utilize the log provider management platform 110. The user devices 102 can also be respectively associated with one or more customers requiring the services of one or more log providers. Some non-limiting examples of log providers that may correspond to the log provider platforms 105 include, but are not necessarily limited to, Splunk®, Elasticsearch®, Logstash®, and Kibana® (ELK) stack and/or Datadog® logging and device monitoring providers.

As noted hereinabove, when an application utilizes a specific log management platform, it may be difficult for the application to switch to a different log management platform without loss of data and without making code modifications that reduce application performance. For example, under conventional approaches, if an application utilizes a different logging product, historical logs of that application from the former logging product are not able to be migrated or are difficult to migrate to the new log provider platform. As a result, historical log data and resulting insight into the application is lost.

In order to address the problems with current approaches, illustrative embodiments provide technical solutions which use machine learning to intelligently recommend optimum log providers for different operations of an application (also referred to herein as "transactions"). For example, depending on the operations being performed by an application, the application may require different types of log providers. The embodiments advantageously provide a pluggable log management framework that permits dynamic addition and/or removal of different log providers and corresponding software. The framework is configured to decouple applications from log providers, thus enabling portability. Leveraging machine learning, the framework predicts optimal log providers for application operations based on historical logging task data and metadata corresponding to multiple features.

The log provider management platform 110 in the present embodiment is assumed to be accessible to the user devices 102 and/or log provider platforms 105 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the log provider management platform 110 includes a logging workflow engine 120, a log provider prediction engine 130 and a log provider interface engine 140. The logging workflow engine 120 includes a logging request receiving layer 121, a data and metadata collection layer 122 and a logging data and metadata repository 123. The log provider prediction engine 130 includes a machine learning layer 131 comprising log provider prediction and training layers 132 and 133. The log provider interface engine 140 includes an interfacing layer 141 and a transformation layer 142.

Figure 2:
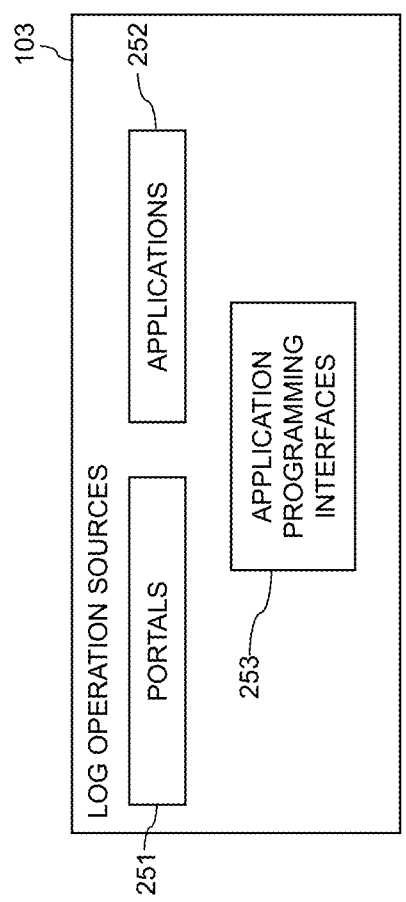
FIG. 2 depicts example log operation sources according to an illustrative embodiment.

The logging request receiving layer 121 of the logging workflow engine 120 receives logging requests from one or more log operation sources 103-1, 103-2, . . . , 103-S (collectively "log operation sources 103"). Referring to FIG. 2, in a non-limiting illustrative embodiment, the log operation sources 103 comprise, for example, one or more of portals 251, applications 252 and application programming interfaces (APIs) 253. For example, requests to log operations can be received via multiple channels including portals 251, applications 252 and/or APIs 253. As explained in more detail herein, the logging workflow engine 120 identifies log providers for operations by invoking a request to the log provider prediction engine 130 to predict a log provider for a given operation. The log provider prediction engine 130 leverages machine learning to predict an optimal log provider for the given operation.

The data and metadata collection layer 122 collects historical logs (e.g., historical log data and metadata) and historical logging task data and metadata from the log operation sources 103 and/or the log provider platforms 105. In addition, the data and metadata collection layer 122 collects data and metadata for a new operation to be logged. The data and metadata for a new operation to be logged may be included with a logging request from one or more log operation sources 103, and can be collected from, for example, the logging request receiving layer 121. The collected historical logs, historical logging task data and metadata and data and metadata for new operations to be logged is stored in the logging data and metadata repository 123.

The historical log data and metadata comprises, for example, log data and metadata. The log data and metadata may correspond to, but is not necessarily limited to, the operation of one or more devices (e.g., performance metrics such as, for example, throughput, latency, input-output operations per second (IOPS), utilization (e.g., memory, central processing unit (CPU) utilization), etc.), logs of application operations that have been executed and/or failed to execute and associated performance metrics, troubleshooting logs, system event logs (SELs), etc. In the case of historical logs, the metadata may specify, for example, device identifiers, application identifiers (e.g., unique identifiers), component identifiers, date and timestamps, log providers, etc. The historical logging task data and metadata, and the data and metadata for a new operation to be logged comprises, for example, features of a historical logging task and of a new operation to be logged. Such features include, for example, metadata identifying a source of a historical logging task or of a new operation to be logged, a source type of a historical logging task or of a new operation to be logged, a domain of a historical logging task or of a new operation to be logged, a cost of a historical logging task, a proposed or desired cost of a logging task for a new operation, a logging time of a historical logging task, a proposed or desired time of a logging task for a new operation and a log provider of a historical logging task. The features may further include whether the source of the historical logging task or of the new operation to be logged (e.g., application, API and/or portal) is in production or development. One or more of the features can be in the form of data in addition to or as an alternative metadata.

The historical log data and metadata, the historical logging task data and metadata, and the data and metadata for a new operation are stored in the logging data and metadata repository 123 in a designated format such as, but not necessarily limited to, a canonical format like JavaScript Object Notation (JSON) format. In illustrative embodiments, the logging data and metadata repository 123 comprises a not only structured query language (NoSQL) database. The logging data and metadata repository 123 is responsible for storing and managing data and metadata in, for example, a standard/canonical format for a given enterprise. Illustrative embodiments utilize, for example, JSON documents for logging task metadata, including a selected log provider, in a NoSQL database (e.g., MongoDB). The logging data and metadata repository 123 stores, for example, the historical log data and/or the historical logging task data in a centralized manner and provides the historical log data and/or metadata and/or the historical logging task data and/or metadata associated with a first log provider to a different log provider if an application switches from one log provider to another log provider. The switch may be made for reasons such as cost, efficiency or other reasons. Use of, for example, JSON format and leveraging a NoSQL database improves data and metadata storage and retrieval when compared with conventional approaches.

In illustrative embodiments, the data and metadata collection layer 122 performs data engineering and data pre-processing to identify the features and the corresponding data and metadata elements that will be influencing the log provider predictions for inputted new operations to be logged. In illustrative embodiments, the data engineering and data pre-processing includes generating multivariate plots and correlation heatmaps to identify the significance of each feature in the collected data and metadata, and filter less important data and metadata elements. The data engineering and data pre-processing reduces the dimensions and complexity of the machine learning model, hence improving the accuracy and performance of the model. In some embodiments, the data engineering and data pre-processing includes cleaning any unwanted characters and stop words from the data and metadata, and performing stemming and lemmatization, as well as changing text to lower case, removing punctuation, and removing incorrect or unnecessary characters. The processed and engineered data is stored in the logging data and metadata repository 123.

As explained in more detail herein, the historical logging task data and metadata from the logging data and metadata repository 123 is used by the log provider prediction engine 130 to train a machine learning model to accurately predict a log provider for a newly received logging operation that needs to be performed.

FIG. 3 depicts a table 300 of sample historical logging task data that may be used to train the one or more machine learning models used for log provider prediction by the log provider prediction engine 130. It is to be understood that the data illustrated in table 300 is illustrative, and the embodiments are not necessarily limited to what is shown in FIG. 3. Logging task data with more or less features may be used in other embodiments. As can be seen in the table 300, the training data identifies multi-dimensional features. The features include, for example, a source application name (e.g., Lightning, Premier, Rev Star, Aero, Tech Direct), source application type (e.g., portal, customer relationship management (CRM), enterprise resource planning (ERP), API etc.), a domain associated with the source application (e.g., sales, supply chain, services, finance etc.), whether the application is in production (yes/no), cost of the logging task (low/medium/high), logging time of the logging task, and an associated log provider. The log providers are identified as targets in the table 300, as the target variable that is being predicted by the machine learning layer 131 of the log provider prediction engine 130 is a log provider.

The log provider prediction engine 130, more particularly, the training layer 133 of the machine learning layer 131 uses the historical logging task data collected by the data and metadata collection layer 122 to train one or more machine learning algorithms used by the log provider prediction layer 132 to predict a log provider to perform a given logging task for an application operation.

The log provider prediction layer 132 of the log provider prediction engine 130 predicts, with a high degree of accuracy, a log provider to perform a logging task. The prediction is based, at least in part, on a variety of features used in the training data received from the logging data and metadata repository 123. Given the complexity and dimensionality of the variety of features, illustrative embodiments utilize a shallow learning approach leveraging a decision tree-based, ensemble bagging technique with a random forest algorithm as a multi-class classification approach for predicting the class which is the log provider. The random forest algorithm is used for prediction and recommendation because of its efficiency and accuracy of processing large volumes of data. The random forest algorithm uses bagging (bootstrap aggregating) to generate predictions; this includes using multiple classifiers (e.g., in parallel) each trained on different data samples and different features. This reduces the variance and the bias that results from using a single classifier. Final classification is achieved by aggregating the predictions that were made by the different classifiers.

Figure 4:
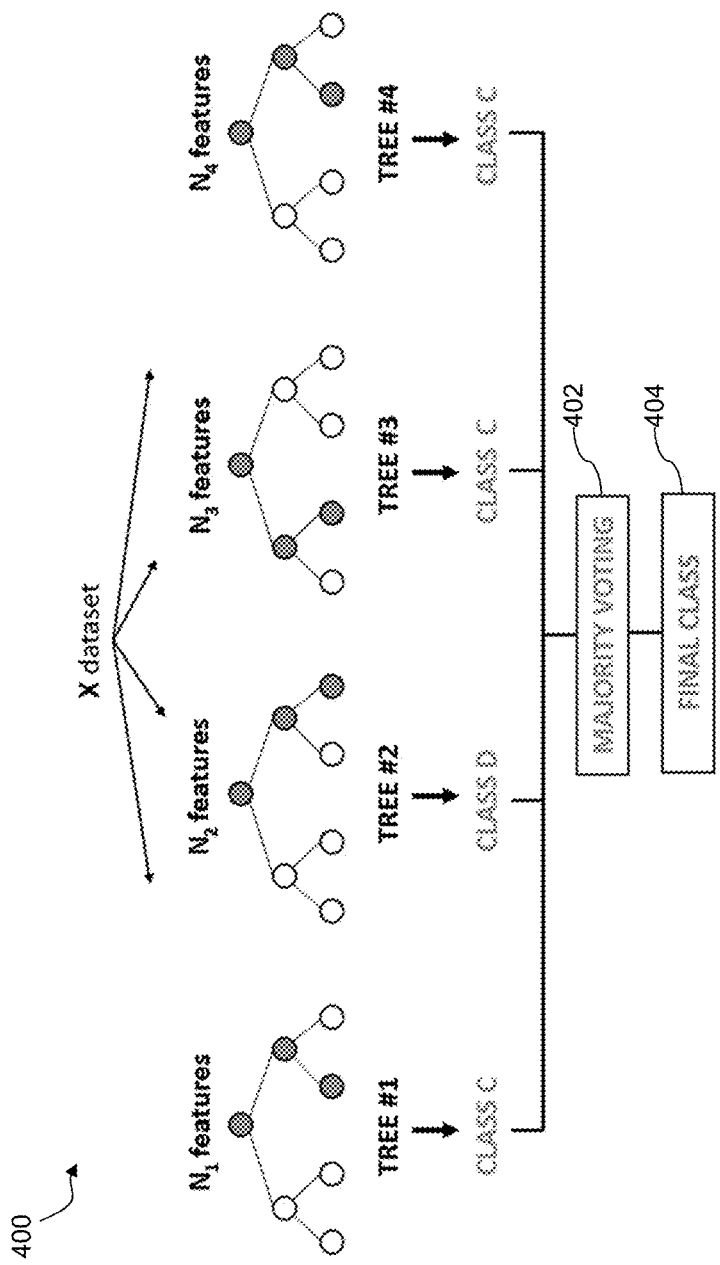
FIG. 4 depicts a plurality of decision trees used in connection with a random forest classifier according to an illustrative embodiment.

Referring to the random forest classifier diagram 400 in FIG. 4, the machine learning layer 131 constructs a plurality of decision trees (Tree #1, Tree #2, Tree #3 and Tree #4) using different features and different data samples, which reduces bias and variance as noted above. In the training process, the decision trees Tree #1, Tree #2, Tree #3 and Tree #4 are constructed using the training data, which comprises historical logging task data and metadata. In the testing process, data ("X dataset" in FIG. 4) comprising, for example, a source (e.g., application) name, source type, a domain associated with the source, whether the source is in production, a proposed/desired cost of the logging task, and a proposed/desired logging time of the logging task, is inputted to the multiple decision trees (Tree #1, Tree #2, Tree #3 and Tree #4) to generate a predicted class (e.g., Class B, C or D) representing a log provider. Based on the inputted data, each decision tree (Tree #1, Tree #2, Tree #3 and Tree #4) yields a class corresponding to a log provider and the final prediction (final class 404) is determined by majority voting 402 (which class received the majority of votes). In illustrative embodiments, a random forest classifier uses multinomial/multi-class classification, meaning the results of the classification would be one of a few types of classes. Each class is a log provider, so there are potentially multiple classes and the model predicts one of the classes (log providers) with a confidence score. The multiple independent variables comprise the features of the X dataset as explained hereinabove, whereas the target variable (Y value) is the log provider class predicted/recommended by the model. Random forest classification is based on the wisdom of a plurality of models. Instead of using just one model (e.g., decision tree) to make a prediction, a random forest technique uses multiple uncorrelated decision trees, which outperforms the methodology when using single tree. The use of multiple decision trees minimizes errors, when compared with using a single decision tree. In this model, even if some trees might yield an incorrect result, the majority of decision trees will produce a correct result. Although four decision trees are shown, the embodiments are not necessarily limited to four decision trees, and more or less decision trees may be used.

Figure 5:
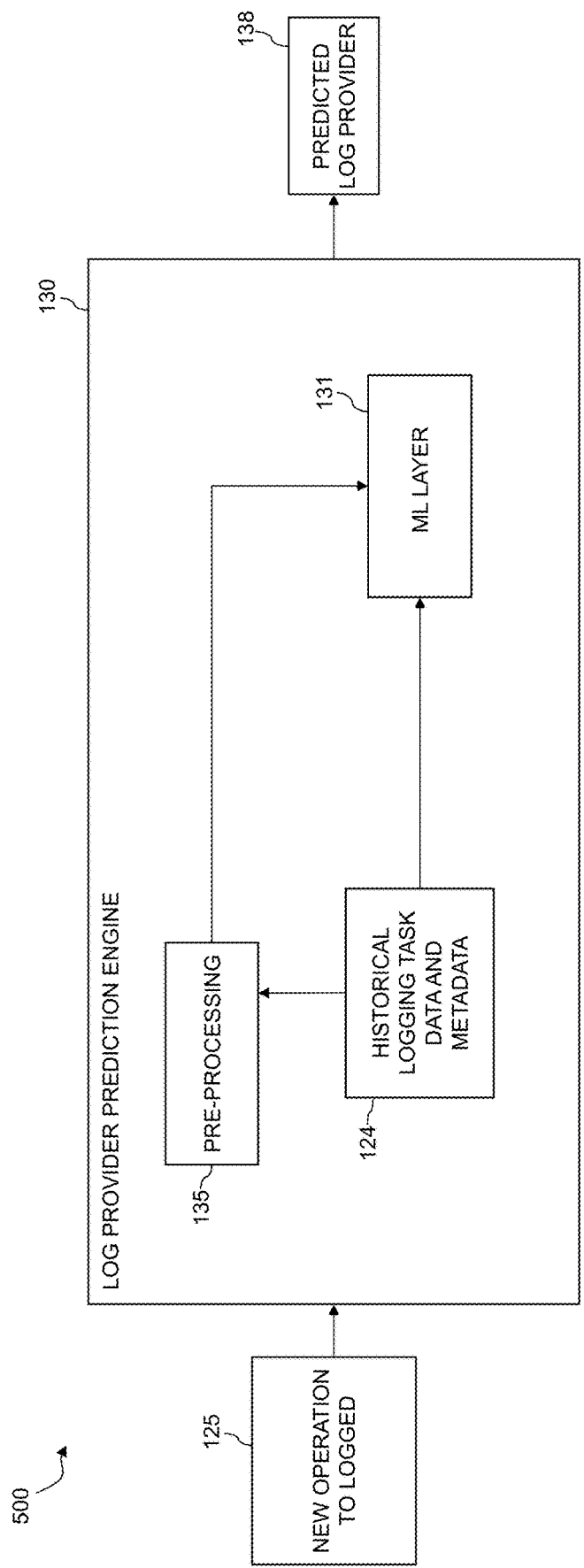
FIG. 5 depicts an operational flow for log provider prediction in an illustrative embodiment.

Referring to the operational flow 500 in FIG. 5, the log provider prediction engine 130 receives as input a new operation to be logged 125 (e.g., in the form of a request to log the new operation from, for example, an application, a portal and/or an API). The request identifies one or more features (e.g., features in X dataset) of the new operation. The log provider prediction engine 130 includes the machine learning (ML) layer 131, which leverages the decision tree-based, ensemble bagging algorithm as explained hereinabove and is trained with historical logging task data and metadata 124 from the logging data and metadata repository 123 to accurately predict a log provider (e.g., predicted log provider 138). In FIG. 5, the log provider prediction engine 130 illustrates a pre-processing component 135, which processes the incoming new operation to be logged 125 and the historical logging task data and metadata 124 for analysis by the ML layer 131. For example, the pre-processing component 135 removes any unwanted characters, punctuation, and stop words. In addition, in illustrative embodiments, the pre-processing component 135 performs data engineering and data pre-processing as described above to identify the significance of each feature in a dataset so that less important data elements to the prediction are given less weight and/or are filtered. Additionally, as described in more detail herein below, the pre-processing component 135 prepares and encodes the data for analysis by the machine learning algorithms. As noted hereinabove, alternatively or in addition, the pre-processing component 135 can be a component of the logging workflow engine 120. In some embodiments, the log provider prediction engine 130 predicts more than one log provider if multiple log providers can perform the new operation to be logged 125 with the same or a similar result.

The predicted log provider 138 is used by the log provider interface engine 140, more particularly, the interfacing layer 141, to interface with the log provider to enable logging of a newly inputted operation. A request to log a newly inputted operation is transmitted, for example, over network 104 to one of the log provider platforms 105 corresponding to the predicted log provider. The interfacing performed by the interfacing layer 141 of the log provider interface engine 140 comprises invoking, for example, an API, a programmatic interface and/or a command line interface (CLI) to communicate the request to log a newly inputted operation to the log provider.

As noted hereinabove, the logging data and metadata repository 123 stores historical log data and metadata and historical logging task data and metadata from previous logging tasks. In illustrative embodiments, historical log and/or logging task data and/or metadata from a previous logging task performed by a first log provider is provided to a new and different log provider (e.g., predicted log provider) in connection with a logging task for a newly received operation. In this case, the transformation layer 142 of the log provider interface engine 140 converts the historical log and/or logging task data and/or metadata from the standard/canonical format in which the historical log and/or logging task data and/or metadata is stored in the logging data and metadata repository 123 to the specific format of the predicted log provider. The transformation layer 142 invokes the appropriate APIs and/or other interfaces to provide the historical log and/or logging task data and/or metadata from a previous logging task performed by the first log provider to the predicted log provider. For example, in a non-limiting operational example, APIs can be called or functions such as, but not necessarily limited to, Log.info( ) or Log.debug( ) can be used for a predicted Splunk® log provider.

The log provider interface engine 140 provides a flexible interface fabric for adding and removing various log providers to and from the log provider management platform 110 without impacting the source applications that use the log provider management platform 110. The log provider interface engine 140, which can be pluggable, abstracts the complexities of interfacing with different log providers. For example, log providers associated with different log provider platforms 105 are configured in various formats such as, for example, API-based, programmatic interface-based, CLI-based, etc. The data formats for each of these log providers can also vary. The log provider interface engine 140 abstracts these integrations and performs data mapping between different log providers. In illustrative embodiments, the log provider interface engine 140 exposes an API that accepts a log provider name along with the log metadata, routes the log metadata to the specified log provider and creates an appropriate data format for the provider to log a given operation. The log provider interface engine 140 also leverages an asynchronous mechanism for backend logging.

In connection with the operation of the log provider prediction engine 130, FIG. 6 depicts example pseudocode 600 for importation of libraries used to implement the log provider prediction engine 130. For example, Python, ScikitLearn, Pandas and Numpy libraries can be used. Illustrative embodiments implement multi-class classification using a random forest classifier to predict a log provider for optimized performance of a logging task.

FIG. 7A depicts example pseudocode 701 for generation of training data and FIG. 7B depicts a table 702 of sample training data. The example pseudocode 701 is for reading historical logging task data and metadata into a Pandas data frame for building training data. A historical task data and/or metadata file including historical logging task data and/or metadata for multiple logging tasks is generated as a CSV file and the data is read to a Pandas data frame before displaying columns as in FIG. 7B. Similar to FIG. 3, FIG. 7B depicts a table 702 of example training data in an illustrative embodiment. As can be seen in the table 702, the training data identifies multi-dimensional features including, for example, source application name, source application type, a domain associated with the source application, whether the application is in production, cost of the logging task, logging time of the logging task, and an associated log provider. The data shown in the table 702 is a non-limiting example of the features of training data, and the embodiments are not necessarily limited to the depicted features.

FIG. 8A depicts example pseudocode 801 for encoding training data. Referring back to the pre-processing component 135 in FIG. 5, since machine learning works with numbers, categorical and textual attributes like source application names, source application types, domains associated with the source applications, whether the application is in production, cost of the logging tasks, log providers, etc. must be encoded before being used as training data. In one or more embodiments, this can be achieved by leveraging a LabelEncoder function of ScikitLearn library as shown in the pseudocode 801 in FIG. 8A. FIG. 8B depicts a table 802 of the encoded training data, where categorical and textual attributes are converted into numerical values.

According to illustrative embodiments, the encoded training dataset is split into training and testing datasets, separate datasets are created for independent variables and dependent variables. Some embodiments use a train_test_split function of an sklearn library to split the data into training and testing sets. The training set is used for training the machine learning model(s) while the test set is used for testing/validating and computing accuracy score(s) of the model(s). In some embodiments, a training set will contain 70% of the observations, while a testing set will contain 30% of the observations. The function also separates the target variable (y) and the independent variables (X). FIG. 9 depicts example pseudocode 900 for splitting a dataset into training and testing components and for creating separate datasets for independent (X) and target (y) variables.

FIG. 10 depicts example pseudocode 1000 for training and computing accuracy of a random forest classifier. In some embodiments, a random forest classifier is used to predict a log provider for a given operation. The predictions, accuracy and confusion matrix are printed. Hyperparameter tuning can be done to improve the accuracy of the model.

In some embodiments, the logging data and metadata repository 123 and other data corpuses, repositories or databases referred to herein are implemented using one or more storage systems or devices associated with the log provider management platform 110. In some embodiments, one or more of the storage systems utilized to implement the logging data and metadata repository 123 and other data corpuses, repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the log provider management platform 110, the logging workflow engine 120, log provider prediction engine 130 and/or log provider interface engine 140 in other embodiments can be implemented at least in part externally to the log provider management platform 110, for example, as stand-alone servers, sets of servers or other types of systems coupled to the network 104. For example, the logging workflow engine 120, log provider prediction engine 130 and/or log provider interface engine 140 may be provided as cloud services accessible by the log provider management platform 110.

The logging workflow engine 120, log provider prediction engine 130 and/or log provider interface engine 140 in the FIG. 1 embodiment are each assumed to be implemented using at least one processing device. Each such processing device generally comprises at least one processor and an associated memory, and implements one or more functional modules for controlling certain features of the logging workflow engine 120, log provider prediction engine 130 and/or log provider interface engine 140.

At least portions of the log provider management platform 110 and the elements thereof may be implemented at least in part in the form of software that is stored in memory and executed by a processor. The log provider management platform 110 and the elements thereof comprise further hardware and software required for running the log provider management platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the logging workflow engine 120, log provider prediction engine 130, log provider interface engine 140 and other elements of the log provider management platform 110 in the present embodiment are shown as part of the log provider management platform 110, at least a portion of the logging workflow engine 120, log provider prediction engine 130, log provider interface engine 140 and other elements of the log provider management platform 110 in other embodiments may be implemented on one or more other processing platforms that are accessible to the log provider management platform 110 over one or more networks. Such elements can each be implemented at least in part within another system element or at least in part utilizing one or more stand-alone elements coupled to the network 104.

It is assumed that the log provider management platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or LXCs, or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the logging workflow engine 120, log provider prediction engine 130, log provider interface engine 140 and other elements of the log provider management platform 110, and the elements thereof can each be implemented in the form of one or more LXCs running on one or more VMs. Other arrangements of one or more processing devices of a processing platform can be used to implement the logging workflow engine 120, log provider prediction engine 130 and log provider interface engine 140, as well as other elements of the log provider management platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the log provider management platform 110 to reside in different data centers. Numerous other distributed implementations of the log provider management platform 110 are possible.

Accordingly, one or each of the logging workflow engine 120, log provider prediction engine 130, log provider interface engine 140 and other elements of the log provider management platform 110 can each be implemented in a distributed manner so as to comprise a plurality of distributed elements implemented on respective ones of a plurality of compute nodes of the log provider management platform 110.

It is to be appreciated that these and other features of illustrative embodiments are presented by way of example only, and should not be construed as limiting in any way. Accordingly, different numbers, types and arrangements of system elements such as the logging workflow engine 120, log provider prediction engine 130, log provider interface engine 140 and other elements of the log provider management platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the log provider management platform can be offered to cloud infrastructure customers or other users as part of FaaS, CaaS and/or PaaS offerings.

Figure 11:
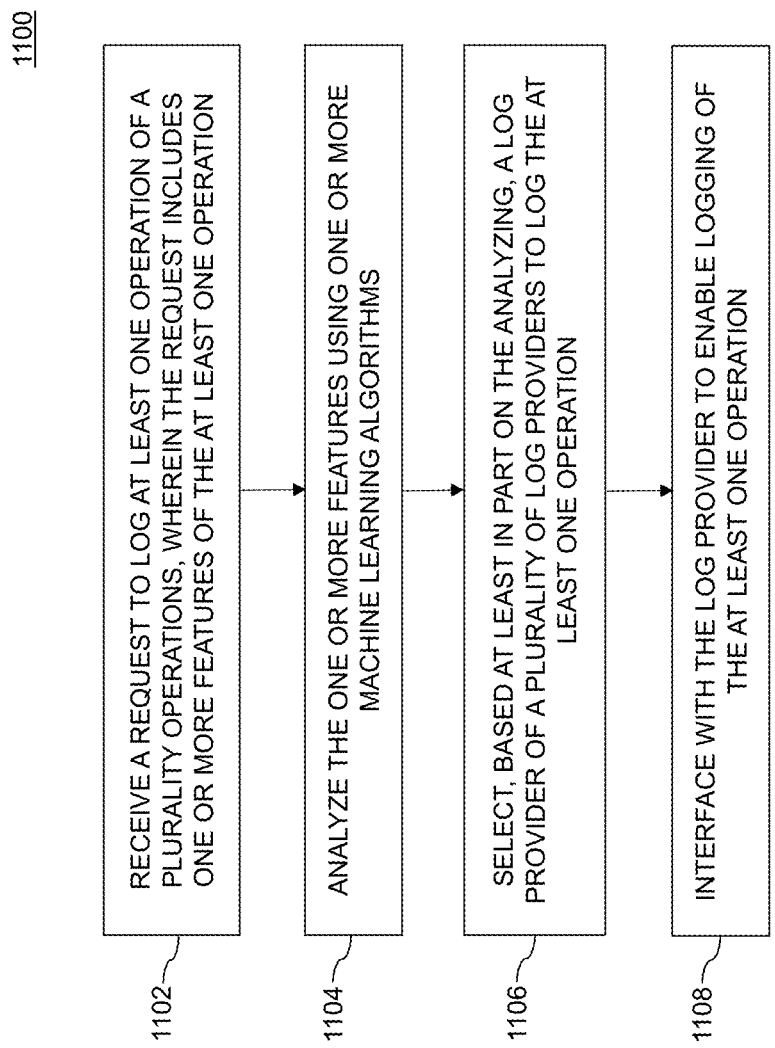
FIG. 11 depicts a process for log provider management according to an illustrative embodiment.

The operation of the information processing system 100 will now be described in further detail with reference to the flow diagram of FIG. 11. With reference to FIG. 11, a process 1100 for log provider management as shown includes steps 1102 through 1108, and is suitable for use in the system 100 but is more generally applicable to other types of information processing systems comprising a log provider management platform configured for selecting and interfacing with log providers to perform logging tasks.

In step 1102, a request to log at least one operation of a plurality operations is received. The request includes one or more features of the at least one operation. At least a portion of the one or more features comprises metadata, and the one or more features identify, for example, a source of the at least one operation, a domain of the at least one operation, and/or a cost of the at least one operation. The source of the at least one operation may comprise, for example, an application, a portal and/or an API.

In step 1104, the one or more features are analyzed using one or more machine learning algorithms. In illustrative embodiments, the one or more machine learning algorithms are trained with historical logging task data. The historical logging task data specifies a plurality of logging tasks associated with respective ones of: (i) a plurality of log providers; (ii) a plurality of sources; (iii) a plurality of domains; (iv) a plurality of costs; and/or (iv) a plurality of log times. In some embodiments, the one or more machine learning algorithms comprise a plurality of decision trees, and the plurality of decision trees are respectively trained with different portions of the historical logging task data.

In step 1106, based at least in part on the analyzing, a log provider of a plurality of log providers is selected to log the at least one operation. Each of the plurality of decision trees yields one log provider of the plurality of log providers to log the at least one operation, and the selection of the log provider to log the at least one operation corresponds to the result produced by a majority of the plurality of decision trees.

Step 1108 comprises interfacing with the log provider to enable logging of the at least one operation. In illustrative embodiments, the interfacing comprises invoking at least one of an application programming interface, a programmatic interface and a command line interface to communicate the request to log the at least one operation to the log provider. In some embodiments, metadata corresponding to logging of one or more other operations by one or more other log providers of the plurality of log providers is stored in a designated format. In this case, the interfacing further comprises transforming the metadata from the designated format to a format of the log provider, and enabling access to the transformed metadata by the log provider. For example, appropriate APIs and/or other interfaces are invoked to provide the metadata from a previous logging task performed by another log provider to the selected log provider. The designated format can comprise, for example, a canonical format such as a JSON format. The metadata may be stored in a NoSQL database.

It is to be appreciated that the FIG. 11 process and other features and functionality described above can be adapted for use with other types of information systems configured to execute log provider management services in a log provider management platform or other type of platform.

The particular processing operations and other system functionality described in conjunction with the flow diagram of FIG. 11 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 11 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a log provider management platform as disclosed herein can provide a number of significant advantages relative to conventional arrangements. For example, the log provider management platform uses machine learning to predict and automatically select log providers for use in connection with logging different operations of one or more applications. The embodiments advantageously leverage sophisticated machine learning classification techniques that are trained using multi-dimensional, historical logging data to predict log providers that are most appropriate for given operations.

Unlike conventional approaches, illustrative embodiments provide technical solutions which offer a modular and pluggable log management framework for multiple applications requiring heterogenous log providers. Advantageously, the framework enables the addition and removal of various log providers and abstracts the complexities of integrations from the applications to the log providers, thereby increasing portability. As an additional advantage, the embodiments utilize a repository that stores logging data and metadata in a particular format and transform data and/or metadata from the repository to formats of the selected log providers. As a result, when an application switches to a different log provider, the framework facilitates migration of historical log data and metadata from a former log provider to a new log provider.

Existing log management approaches undesirably restrict applications to certain log providers when other log providers are better suited for logging particular operations. In addition, current log management techniques are loosely based on organizational standards and/or personnel recommendations and lack intelligence to select optimal log providers for different operations. To address these technical problems, the embodiments provide technical solutions which formulate programmatically and with a high degree of accuracy the capability to use specialized machine learning algorithms to intelligently predict log providers that will yield optimal results for logging of particular operations. By training multiple decision tree classifiers with different historical logging task metrics, the random forest algorithm of the illustrative embodiments advantageously analyzes multiple combinations of logging task features to efficiently and accurately predict an optimal log provider for respective application operations.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the log provider management platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a log provider management platform in illustrative embodiments. These and other cloud-based systems in illustrative embodiments can include object stores.

Illustrative embodiments of processing platforms will now be described in greater detail with reference to FIGS. 12 and 13. Although described in the context of system 100, these platforms may also be used to implement at least portions of other information processing systems in other embodiments.

Figure 12:
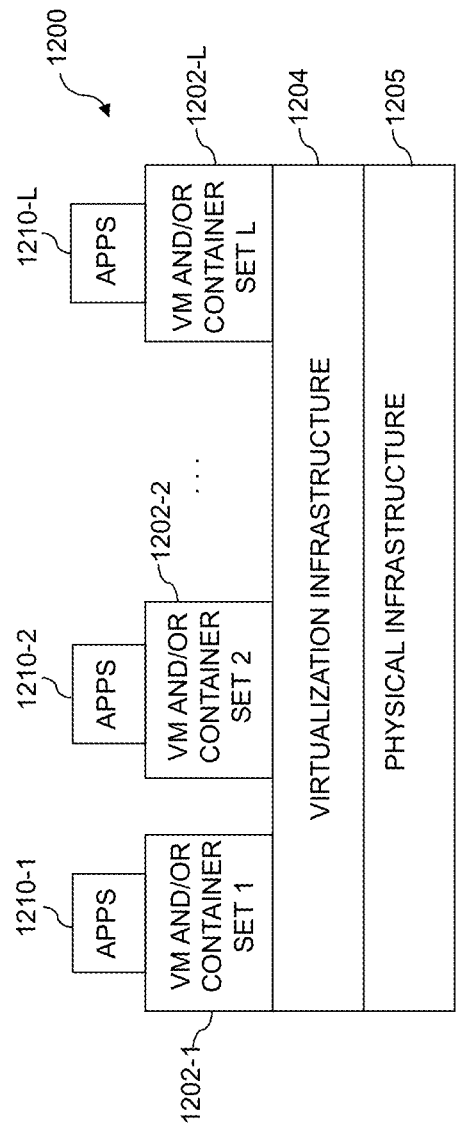
FIGS. 12 and 13 show examples of processing platforms that may be utilized to implement at least a portion of an information processing system according to illustrative embodiments.
Figure 13:
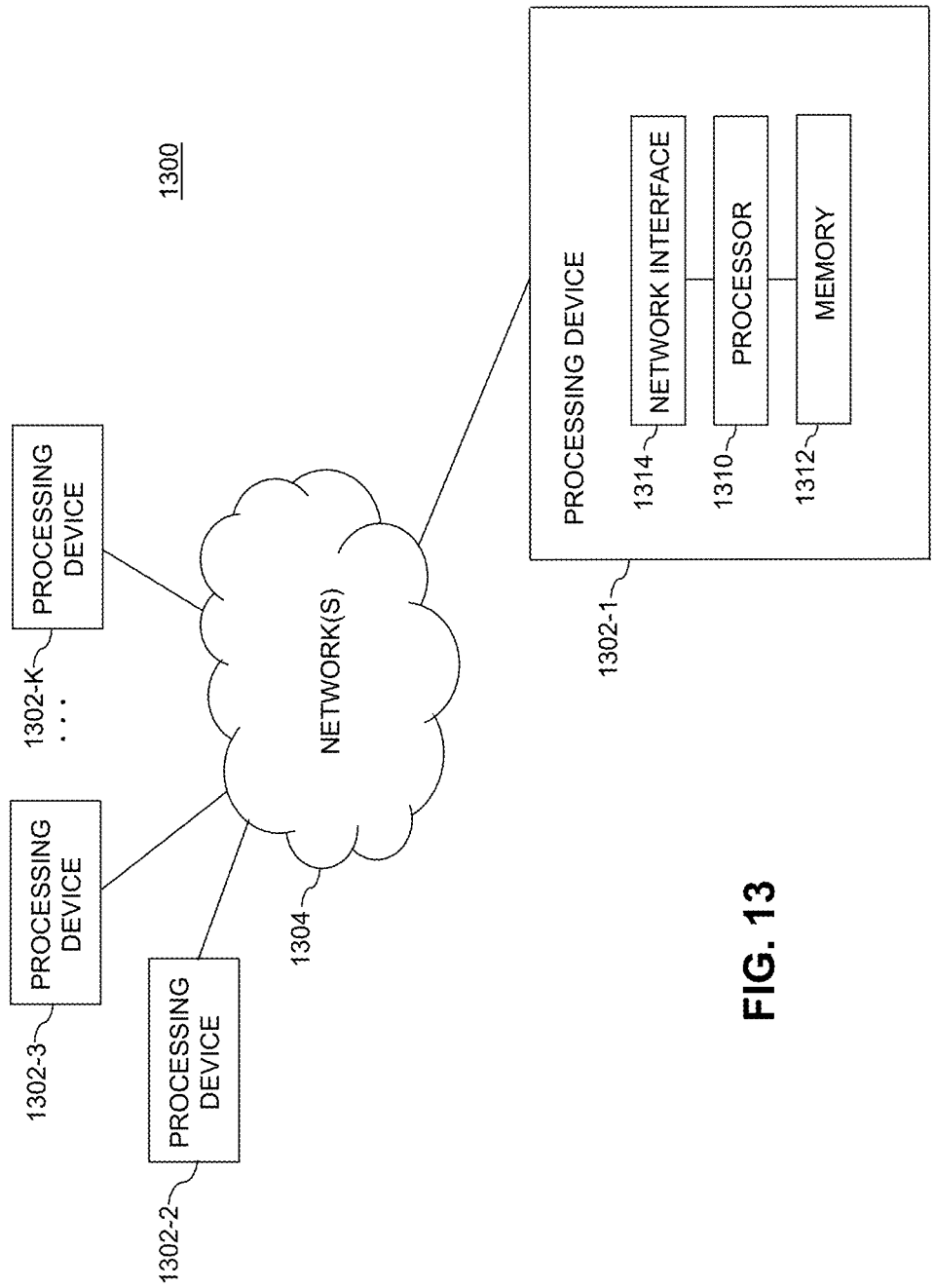

FIG. 12 shows an example processing platform comprising cloud infrastructure 1200. The cloud infrastructure 1200 comprises a combination of physical and virtual processing resources that may be utilized to implement at least a portion of the information processing system 100. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. A hypervisor platform may be used to implement a hypervisor within the virtualization infrastructure 1204, where the hypervisor platform has an associated virtual infrastructure management system. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312. The processor 1310 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the log provider management platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and log provider management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
receiving a request to log at least one operation of a plurality operations, wherein the request includes one or more features of the at least one operation;
analyzing the one or more features using one or more machine learning algorithms;
selecting, based at least in part on the analyzing, a log provider of a plurality of log providers to log the at least one operation;
interfacing with the log provider to enable logging of the at least one operation;
storing log data and metadata corresponding to logging of one or more other operations performed by one or more other log providers of the plurality of log providers, wherein the one or more other log providers are different from the selected log provider, and wherein the log data and the metadata are stored in a designated format;
transforming the log data and the metadata from the designated format to a format of the selected log provider; and
enabling access to the transformed log data and the transformed metadata by the selected log provider, wherein enabling the access comprises invoking at least one of an interface and a function of the selected log provider to provide the transformed log data and the transformed metadata to the selected log provider;
wherein the steps of the method are executed by a processing device operatively coupled to a memory.

2. The method of claim 1 wherein at least a portion of the one or more features comprises metadata corresponding to the at least one operation.

3. The method of claim 1 wherein the one or more features identify at least one of a source of the at least one operation, a domain of the at least one operation, and a cost of the at least one operation.

4. The method of claim 3 wherein the source of the at least one operation comprises at least one of an application, a portal and an application programming interface.

5. The method of claim 1 wherein the interfacing comprises invoking at least one of an application programming interface, a programmatic interface and a command line interface to communicate the request to log the at least one operation to the selected log provider.

6. The method of claim 1 wherein the designated format comprises a canonical format.

7. The method of claim 6 wherein the designated format comprises a JavaScript Object Notation (JSON) format.

8. The method of claim 7 wherein the metadata is stored in a not only structured query language (NoSQL) database.

9. The method of claim 1 further comprising training the one or more machine learning algorithms with historical logging task data.

10. The method of claim 9 wherein the historical logging task data specifies a plurality of logging tasks associated with at least one of respective ones of: (i) the plurality of log providers; (ii) a plurality of sources; (iii) a plurality of domains; (iv) a plurality of costs; and (iv) a plurality of log times.

11. The method of claim 9 wherein the one or more machine learning algorithms comprise a plurality of decision trees, and the plurality of decision trees are respectively trained with different portions of the historical logging task data.

12. The method of claim 11 wherein:
each of the plurality of decision trees yields one log provider of the plurality of log providers to log the at least one operation; and
the selection of the selected log provider to log the at least one operation corresponds to a result produced by a majority of the plurality of decision trees.

13. An apparatus comprising:
a processing device operatively coupled to a memory and configured:
to receive a request to log at least one operation of a plurality operations, wherein the request includes one or more features of the at least one operation;
to analyze the one or more features using one or more machine learning algorithms;
to select, based at least in part on the analyzing, a log provider of a plurality of log providers to log the at least one operation;
to interface with the log provider to enable logging of the at least one operation;
to store log data and metadata corresponding to logging of one or more other operations performed by one or more other log providers of the plurality of log providers, wherein the one or more other log providers are different from the selected log provider, and wherein the log data and the metadata are stored in a designated format;
to transform the log data and the metadata from the designated format to a format of the selected log provider; and
to enable access to the transformed log data and the transformed metadata by the selected log provider, wherein enabling the access comprises invoking at least one of an interface and a function of the selected log provider to provide the transformed log data and the transformed metadata to the selected log provider.

14. The apparatus of claim 13 wherein at least a portion of the one or more features comprises metadata corresponding to the at least one operation.

15. The apparatus of claim 13 wherein the one or more features identify at least one of a source of the at least one operation, a domain of the at least one operation, and a cost of the at least one operation.

16. The apparatus of claim 13 wherein the interfacing comprises invoking at least one of an application programming interface, a programmatic interface and a command line interface to communicate the request to log the at least one operation to the selected log provider.

17. An article of manufacture comprising a non-transitory processor-readable storage medium having stored therein program code of one or more software programs, wherein the program code when executed by at least one processing device causes said at least one processing device to perform the steps of:
receiving a request to log at least one operation of a plurality operations, wherein the request includes one or more features of the at least one operation;

analyzing the one or more features using one or more machine learning algorithms;

selecting, based at least in part on the analyzing, a log provider of a plurality of log providers to log the at least one operation;

interfacing with the log provider to enable logging of the at least one operation;

storing log data and metadata corresponding to logging of one or more other operations performed by one or more other log providers of the plurality of log providers, wherein the one or more other log providers are different from the selected log provider, and wherein the log data and the metadata are stored in a designated format;

transforming the log data and the metadata from the designated format to a format of the selected log provider; and enabling access to the transformed log data and the transformed metadata by the selected log provider, wherein enabling the access comprises invoking at least one of an interface and a function of the selected log provider to provide the transformed log data and the transformed metadata to the selected log provider.

18. The article of manufacture of claim 17 wherein at least a portion of the one or more features comprises metadata corresponding to the at least one operation.

19. The article of manufacture of claim 17 wherein the one or more features identify at least one of a source of the at least one operation, a domain of the at least one operation, and a cost of the at least one operation.

20. The article of manufacture of claim 17 wherein the interfacing comprises invoking at least one of an application programming interface, a programmatic interface and a command line interface to communicate the request to log the at least one operation to the selected log provider.

* * * * *